United States Patent
Mitchell et al.

(10) Patent No.: US 12,495,043 B2
(45) Date of Patent: Dec. 9, 2025

(54) PLUGIN BASED HOST DEFINITIONS FOR A MULTI-CLOUD INFRASTRUCTURE

(71) Applicant: International Business Machines Corporation, Armonk, NY (US)

(72) Inventors: Jeff Mitchell, Boston, MA (US); Michael J. Gaffney, Perry Hall, MD (US); Christopher Joseph Marchesi, Vancouver (CA); Todd Knight, Tucson, AZ (US); James Lambert, Milford, MA (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 17/838,010

(22) Filed: Jun. 10, 2022

(65) Prior Publication Data
US 2023/0403278 A1    Dec. 14, 2023

(51) Int. Cl.
*H04L 9/40* (2022.01)
*G06F 9/445* (2018.01)
*G06F 40/103* (2020.01)

(52) U.S. Cl.
CPC .......... *H04L 63/10* (2013.01); *G06F 9/44526* (2013.01); *G06F 40/103* (2020.01)

(58) Field of Classification Search
CPC ....... H04L 63/10; H04L 63/102; H04L 67/51; H04L 67/02; H04L 63/0428; H04L 63/08; H04L 63/20; G06F 9/44526; G06F 40/103; G06F 21/6218; H04W 12/08
See application file for complete search history.

(56) References Cited

U.S. PATENT DOCUMENTS

| | | | |
|---|---|---|---|
| 6,178,159 B1* | 1/2001 | He | H04Q 11/0478 370/468 |
| 7,376,084 B2* | 5/2008 | Raghunath | H04Q 3/0062 370/233 |
| 7,979,548 B2* | 7/2011 | Arndt | H04L 49/358 709/226 |
| 10,114,792 B2* | 10/2018 | Sajeepa | G06F 15/17331 |
| 10,469,621 B2* | 11/2019 | Høeg | H04L 41/0895 |
| 10,693,806 B2* | 6/2020 | Su | H04L 41/5025 |
| 10,757,197 B2* | 8/2020 | Pogrebinsky | G06F 9/5072 |
| 11,611,633 B2* | 3/2023 | Bennet | H04L 67/131 |
| 2008/0005330 A1* | 1/2008 | Behrendt | H04L 41/0806 709/226 |
| 2015/0121483 A1* | 4/2015 | Perez | H04L 63/08 726/5 |
| 2020/0036599 A1* | 1/2020 | Savov | H04L 41/22 |

* cited by examiner

*Primary Examiner* — Ninos Donabed
(74) *Attorney, Agent, or Firm* — CANTOR COLBURN LLP; Rakesh Roy

(57) ABSTRACT

A system for accessing computing elements of a cloud computing infrastructure includes a dynamic host interface associated with an identity-based access management system. The dynamic host interface is configured to receive host catalogs from components of the cloud computing infrastructure, each host catalog including one or more host sets, each of the one or more host sets including references to one or more hosts, where each of the one or more hosts represents an addressable computing element. The system further includes a plugin-based hosts model in a memory, and being configured to receive, from the dynamic host interface, the host catalogs for identity-based access to the one or more host sets by a user of a client computer to address the addressable computing element represented by the host.

10 Claims, 6 Drawing Sheets

PLUGIN BASED HOST DEFINITIONS FOR A MULTI-CLOUD INFRASTRUCTURE

TECHNICAL FIELD

The subject matter described herein relates to cloud computing, and more particularly to an interface and associated resources for a plugin-based host service for providing dynamic host catalogs for cloud-based applications hosted on any of a number of cloud service providers.

BACKGROUND

In a system for managing identity-based access to computing resources, such as Boundary™ by HashiCorp®, a target represents a networked service a user can connect to and interact with. Targets contain one or more hosts, which are considered equivalent to each other from an access control perspective. A session represents a set of connections between a user and a host from a target, and begins with an authorized user requesting access to a target and ends with a session termination event. Typically, sessions have a maximum time limit.

Identity-based access systems can have a number of resources defined in their domain model, and can be tailored toward managing knowledge of and access to specific addressable computing elements. These include: hosts, which represent an addressable computing element; host sets, which represent collections of hosts, and which are all equivalent for the purpose of access control; and host catalogs, which contain both hosts and host sets. Current identity-based access systems have a single way to register or configure hosts within the system, a method known as "static" in Boundary™, and which requires operators to manually define host catalogs, host sets, and hosts, as well as manually adding hosts to a specific host set.

There are a number of cloud services and host providers with which an identity-based access system can interoperate. Historically, in conventional cloud services, a vendor-provided library is used to facilitate interoperability with a broad array of services, as well as empower third parties to develop their own custom solutions for identity-based access. However, each third party can have drastically different terminology, APIs and configurations. The set of hosts they expose could be anything from relatively static to very dynamic, yet a specific host will need to be retrievable for a specific host-set whenever a read is made on the host-set, as well as when a new session is started.

Accordingly, what is needed is a system and method for constructing and managing a dynamic set of hosts from various cloud providers and using a plugin interface.

SUMMARY

This document describes an interface and new resources for plugin-based hosts. These features provide dynamic host catalog capabilities for a variety of cloud applications and cloud computing platforms, such as AWS, Consul, Kubernetes, Azure, and more. A new data model and API are presented so that the libraries used to implement the plugin-based hosts can be exported in the future for additional third-party integration.

In one aspect, a system, method and computer program product are presented for accessing, by a client computer via an identity-based access management system of a cloud computing infrastructure, one or more addressable computing elements of the cloud computing infrastructure.

In certain aspects, the system includes a dynamic host interface associated with the identity-based access management system. The dynamic host interface is configured to receive one or more host catalogs from components of the cloud computing infrastructure. Each of the one or more host catalogs includes one or more host sets, each of the one or more host sets includes references to one or more hosts, and each of the one or more hosts represents one of the one or more addressable computing elements. The system further includes a plugin-based hosts model formed in a memory associated with the identity-based access management system. The plugin-based hosts model is configured to receive, from the dynamic host interface, the one or more host catalogs for identity-based access to the one or more host sets by a user of the client computer, to address the one or more addressable computing elements of the cloud computing infrastructure represented by the one or more hosts.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a plugin-based host system and method, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

This document describes an interface and new resources for plugin-based hosts of an identity-based access system. These features provide dynamic host catalog capabilities for a variety of cloud applications such as AWS®, Consul®, Kubernetes®, Azure®, and more. A data model and application programming interface (API) are configured to be exported for third party integration by libraries used to implement them.

Figure 1:
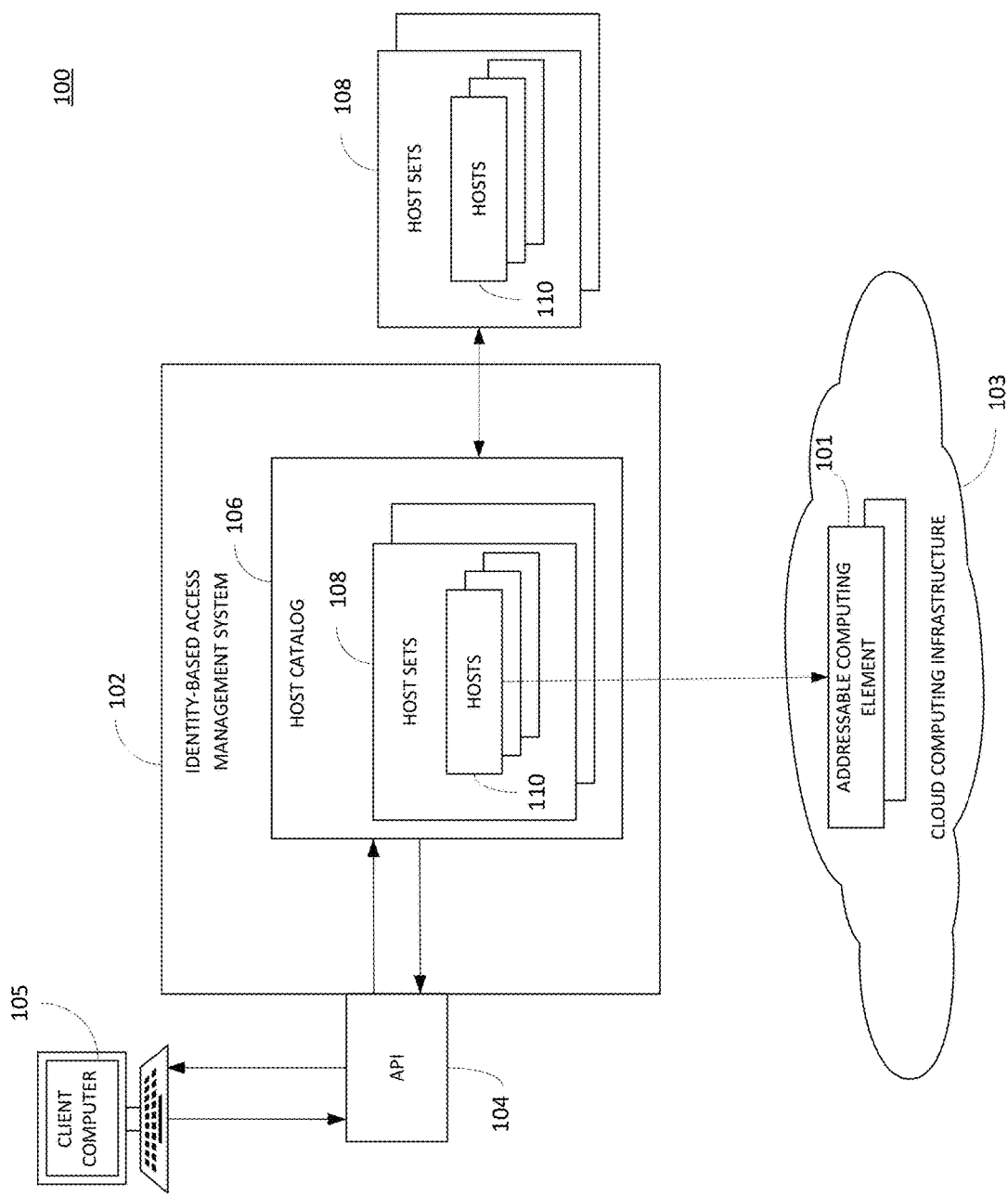
FIG. 1 shows a system having one or more features consistent with implementations of the current subject matter.

As illustrated in FIG. 1, a system 100 can include an identity-based access management system 102 for enabling a user of a client computer 105 to access computing resources (addressable computing elements 101) of a cloud computing infrastructure 103. The identity-based access management system 102 communicates with the client computer 105 via an application programming interface (API) 104. The identity-based access management system 102 employs: hosts 110, which represent an addressable computing element 101; host sets 108, which represent collections of hosts 110, and which are all equivalent for the purpose of access control; and host catalogs 106, which contain both hosts 110 and host sets 108.

The host sets 108 and hosts 110 can be embedded in the identity-based access management system 102, or can be implemented in a plug-in model with the identity-based access management system 102, as shown in FIG. 1. As a plug-in, the host sets 108 and hosts 110 may require different processes for access by the host catalog 106 of the identity-based access management system 102.

In one example, resources in the identity-based access system 102 can have a set of fields which are common to all resources of a common type including name, description, create_time, etc. This convention can be generalized for all resources within a larger domain hierarchy. Fields that are specific to a subtype are contained within an attributes field in any API requests. The attributes field is an object which can contain any set of fields inside of it. This allows for flexibility in the fields when creating a new subtype of a specific resource type, while allowing operations on a variety of subtypes in a uniform way.

Figure 2:
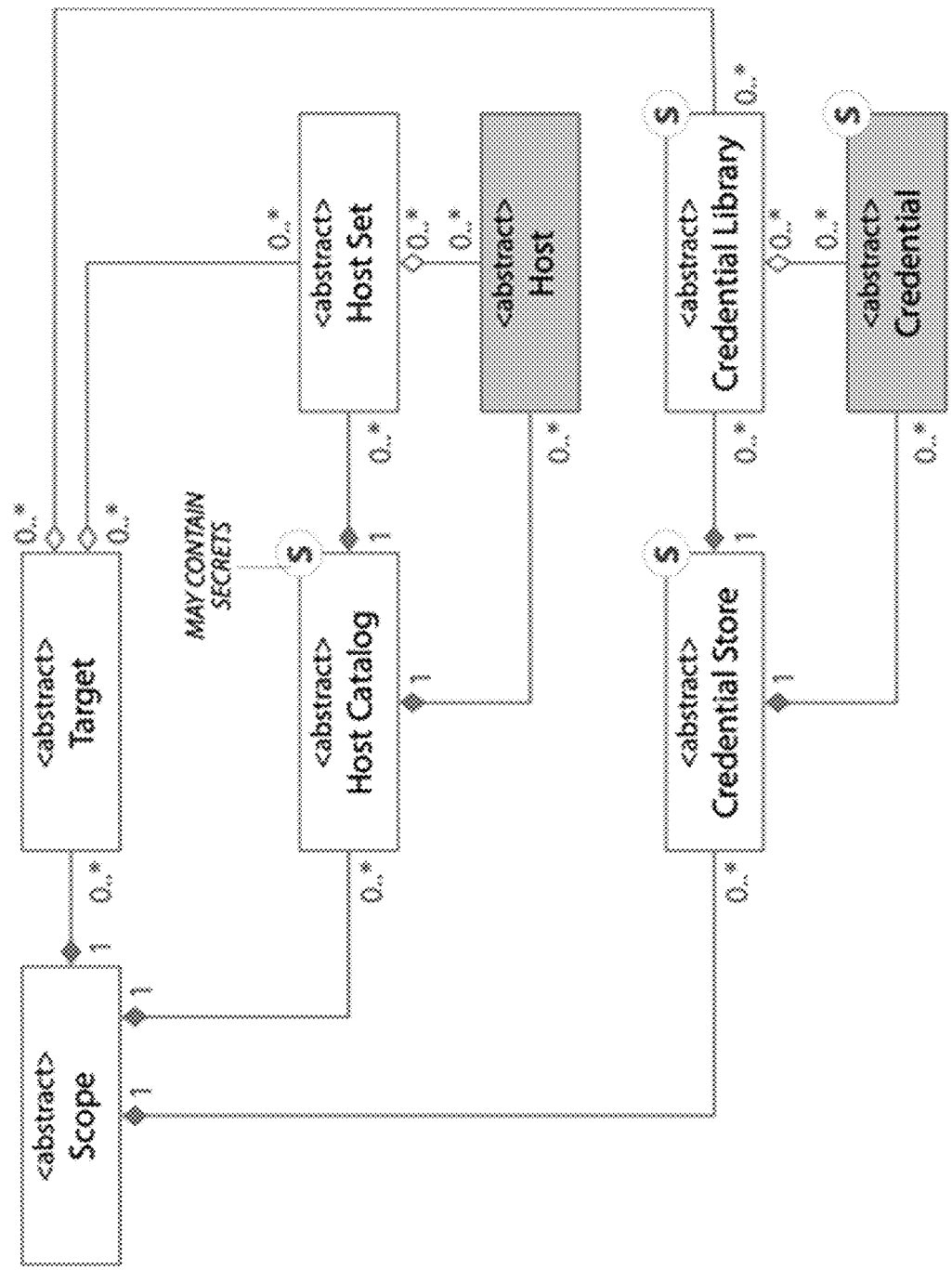
FIG. 2 is a diagram illustrating a relationship between host catalogs and host sets within an identity-based access system.

FIG. 2 is a diagram illustrating a relationship between host catalogs and host sets within an identity-based access system, consistent with implementations described herein. The implementation illustrated in FIG. 2 specifically focuses on the interactions between targets and host sets in the context of authorization of a session created by, or associated with, a target and the selection of a host to which to connect. This diagram illustrates how the host set (and by proxy, the host catalog) dictate what a target can connect to.

While a target may contain one or more host sets, those host sets belong to a host catalog, which is ultimately a superset of the hosts contained in the host sets, however, they need not be the same host catalog.

Figure 3:
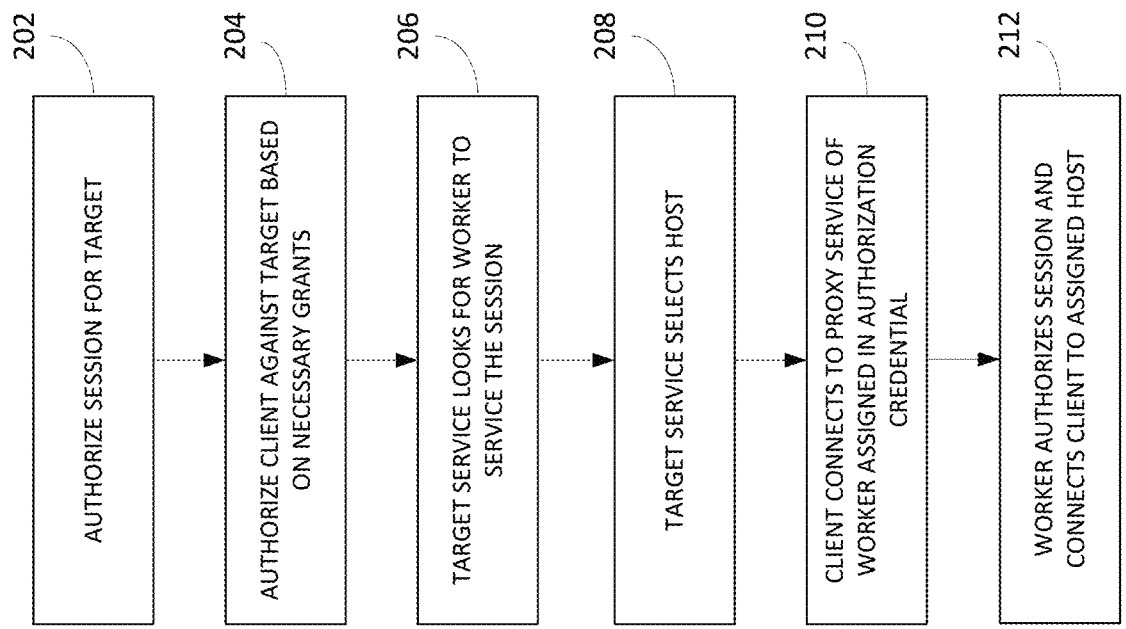
FIG. 3 is a flowchart of a method to authorize a connection to a particular target's backing host.

In some implementations, an identity-based access system can authorize a connection and connect a client to a particular host associated with a particular service. FIG. 3 is a flowchart of a method to authorize the connection. At 202, a session is authorized for the target. Among other things, this returns an authorization credential, such as the authorization_token, necessary to connect the session to a proxy service. At 204, the client is authorized to access the target based on the client having the necessary grants for the target's scope. At 206, the target service looks for a proxy to service the session, and at 208 the target service selects a host. This is done by iterating over all hosts and/or host sets assigned to the target. How hosts are looked up can vary by subtype. For example, if a specific host is requested, it is validated and used, otherwise a host is selected at random.

At 210, the client connects to the proxy service of a worker assigned in the authorization_token. The worker is a process that performs a function other than serve web requests, such as running scheduling jobs, processing files or other activities. At 212, the worker authorizes the session and connects the client to the assigned host. Via this authorization-time mechanism, the host catalog, as well as the host set subtypes, can ultimately be provided that do not include predetermined static hosts themselves. In accordance with implementations described herein, new plugin-based host subtypes can be provided for host catalogs and host sets. These subtypes abstract away the process of having to manually populate hosts; hence, each subtype can include a persistent host entity, but where their details/metadata and lifecycle are managed by the upstream cloud via the plugin.

Plugin Hosts Model

Figure 4:
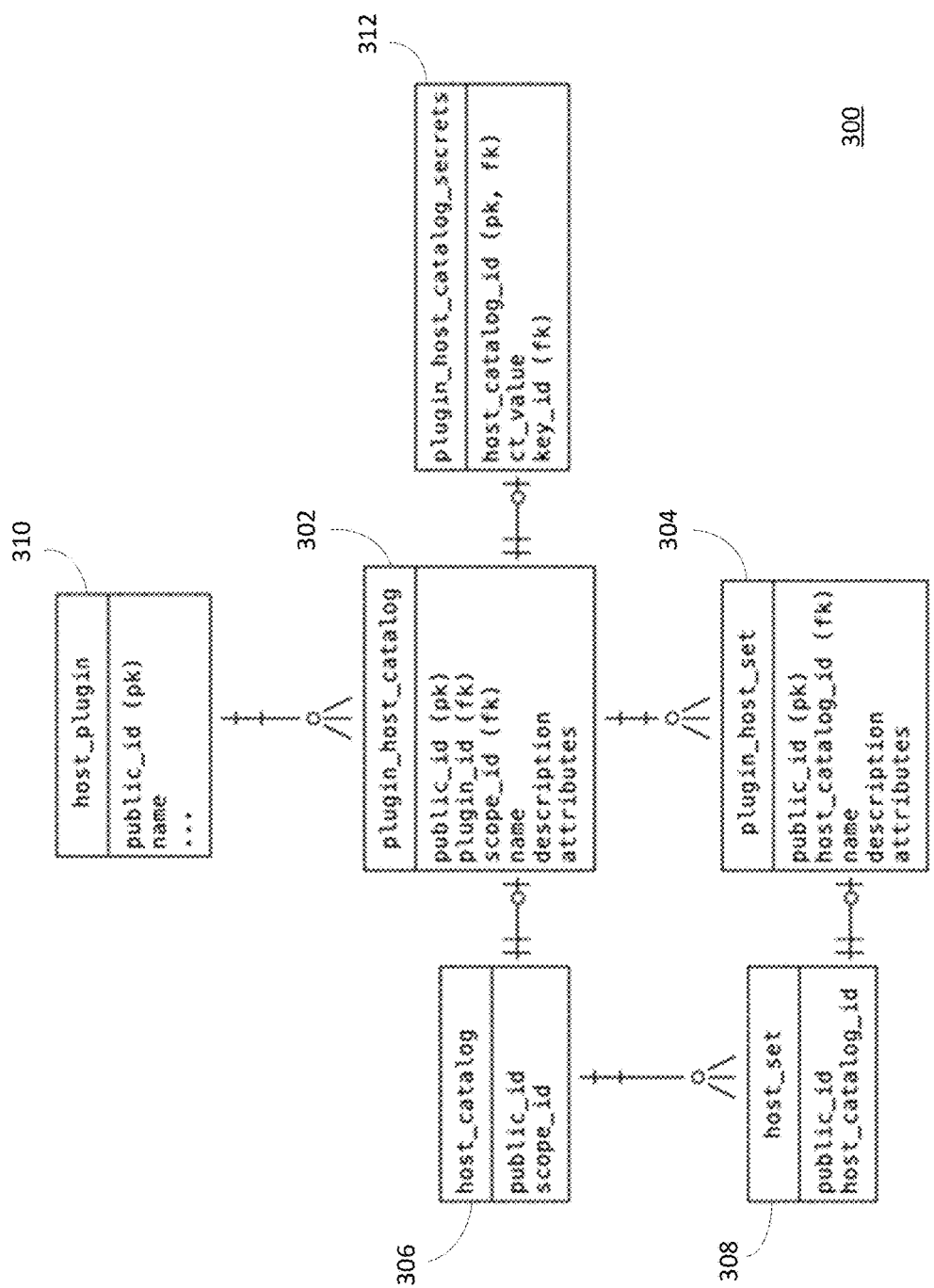
FIG. 4 is a relationship diagram illustrating details of a plugin host catalog and plugin host set table(s), as well as their interrelationship in accordance with various implementations described herein.

FIG. 4 is a relationship diagram 300 illustrating details of a plugin_host_catalog table 302 and plugin_host_set table(s) 304, as well as their interrelationship in accordance with various implementations described herein. These are the main representations of the plugin-based host subtypes. Entries in these tables have corresponding entries in a base-type host_catalog table 306 and host_set table(s) 308, respectively. While both the plugin_host_catalog table 302 and plugin_host_set table(s) 304 tables have "attributes" columns, the data in each may differ, with account-level detail mostly going into host catalogs (host_catalog table 306, for example: secrets), and selection-level detail going into host sets (host_set table(s) 308, for example: filters). Filters can be based on host services, geographical boundaries, domain name service (DNS) catalogs, or the like. Plugin-based host catalogs reference a particular plugin described in a host_plugin table 310 and related tables, such as a plugin_host_catalog_secrets table 312, and as described further below.

As mentioned above, information necessary for a plugin's operation may be split between host catalogs, host sets, and hosts. For example, catalogs can contain account details, secrets, and anything else related to an "identity" concern of a particular superset of hosts, while sets might only contain details necessary to group hosts into a particular set. The data model shown in FIG. 4 can support services for both plugin-type host catalogs and plugin-type host sets as well as "static" host sets and hosts that are built directly into the identity-based access management system and part of its compiled code, as described above with reference to FIG. 1.

Plugin Data Model

Figure 5:
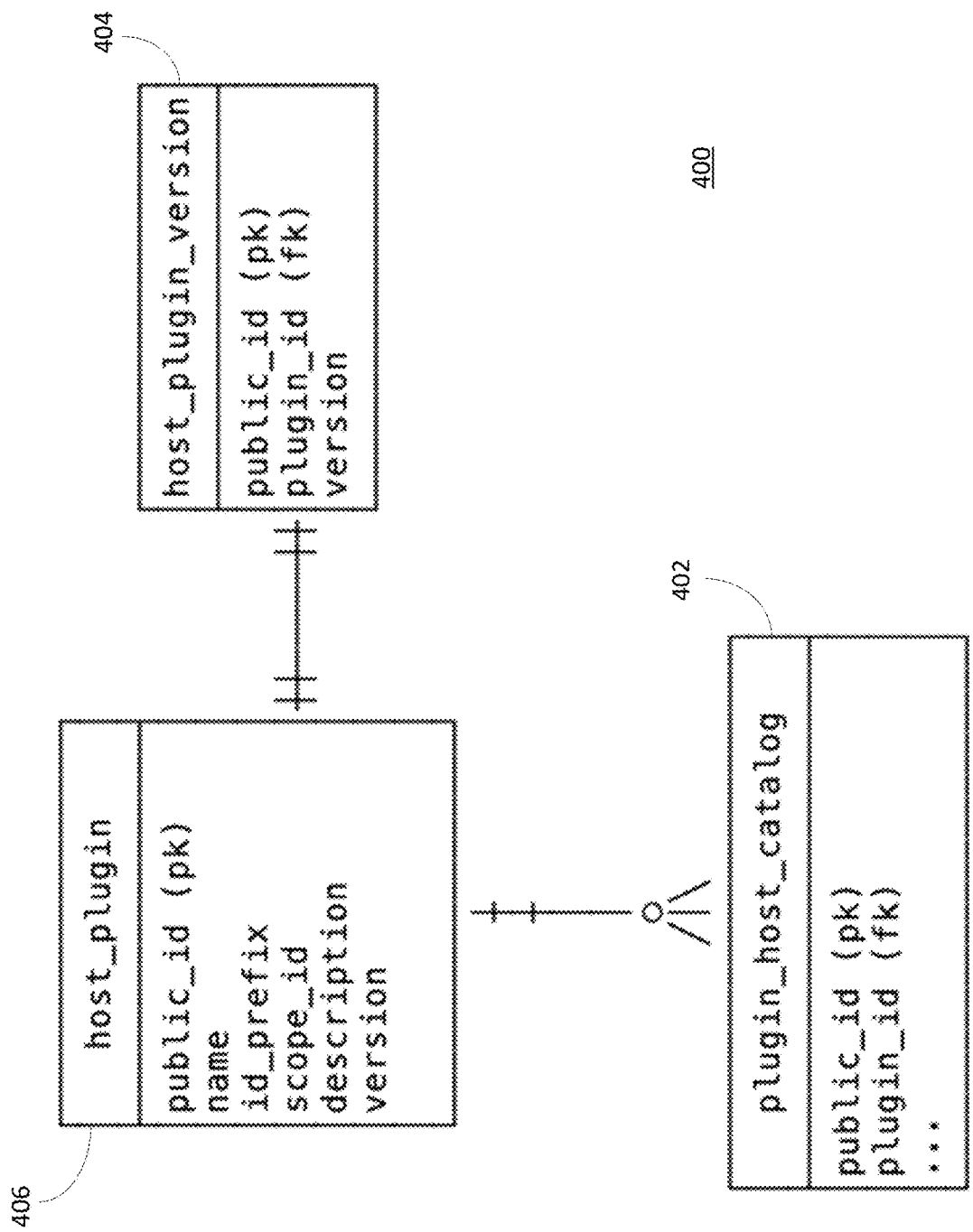
FIG. 5 is a relationship diagram 400 of a plugin data model in accordance with some implementations.

FIG. 5 is a relationship diagram 400 of a plugin data model in accordance with some implementations. This relationship diagram 400 illustrates a relationship between various plugin tables and a plugin_host_catalog 402, to which the plugin tables ultimately link. In some implementations, plugins can be directly embedded, i.e., as Golang ("GO") packages, for example, whereas in other implementations, the plugins can be installed and run by an identity-based access system. As such, the data in a host_plugin_version 404, which can be used to provide details on available plugin versions, can also be used to present a complete data model that can be built for plugin availability. An important aspect of the data model is to be able to inform the identity-based access system about the host catalog types that are available to the system. The name column in the host_plugin table 406 is the denoting field, which can include well-known plugin types such as ec2, consul, or k8s (Kubernetes).

API

In accordance with some implementations of this disclosure, a backing service is any service that a cloud-based application consumes or accesses over a network as part of its operation. The plugin-based host catalog resource as described herein contains all configurations needed for a plugin to operate on the host catalog, including credentials to connect to the backing service, service specific flags, and any other information used by the plugin to determine how it should interact with the backing service.

The plugin-based host catalog resource as described above can be reflected in the API, for example, in Create, Read, Update, Delete, List (CRUDL) operations in existing host catalog and host set services. Various API service handlers servicing plugin-based host catalogs and host sets can be modified to allow specifying non-static catalog types. The logic can initially be a simple check to ensure that the catalog type is not static. If not, it can be assumed to be a plugin-based host catalog, and its type will be validated against the name field in the host_plugin table.

Plugin-Specific Fields (Attributes, Secrets)

In some specific implementations, there are two fields specific to the configuration of host catalogs and sets: attributes and secrets. Attributes are designed to contain non-sensitive configuration details for both host catalogs and host sets. The expected parameters can vary from host catalogs and host sets. Examples are:

Host Catalogs: Endpoint details, sensitive and/or non-sensitive account information, and other metadata that applies to all sets in the catalog.

Host Sets: Details specific to the host set only. Example: any parameters and filters required by DescribeInstances in Amazon EC2.

Attributes can be validated (along with possible credential mutation) during the lifecycle of a host catalog or host set entity, through a set of hooks on all CRUDL operations.

In the case of secrets, this field only contains credential and other secret details that should not be retained in plain text. This information is sent to the host plugin for validation, and possibly mutation, before being returned back to the identity-based access management system for storage in a host_catalog_plugin_secrets table.

Credential Data Encryption

Note that all data provided through the secrets field can be encrypted and stored in a plugin_host_secrets table. This can be done within the identity-based access management system using any available means, such as at the repository level using the same patterns used to encrypt secret data, such as OpenID Connect (OIDC) authentication protocol data and other secret data.

The following is a sample of request data set for a plugin host catalog:

```
{
    ...
    "type": "ec2",
    "attributes": {
        "region": "us-east-1"
    },
    "secrets": {
        "access_key_id": "my-access-key",
        "secret_access_key": "my-secret-key"
    }
}
```

This sample request illustrates how the plugin type is communicated via the type field, how attributes that apply to all host sets within the catalog (such as the region) are communicated, and how credentials are passed through via secrets. In some implementations, the data passed in through the secrets field can be write-only to the API and need not be returned through read operations.

The following is a sample custom attribute set for a plugin host set.

```
{
    ...
    "type": "ec2",
    "attributes": {
        "type": "DescribeInstances",
        "params": {
            "filter": {
                "subnet-id": "subnet-12344567890"
            }
        }
    }
}
```

This attribute set can go in the attributes field of the API request. This sample request shows the difference between the attributes of a host catalog and a host set. Since a host set's attributes define the hosts which are contained in the host set itself, the type of query used to find those hosts (DescribeInstances), and its parameters (a filter on the subnet ID of the instances) are defined here.

Querying for Hosts

One of the main responsibilities of an identity-based access management system implementing such a plugin-based host model, and as described herein, is to provide an abstraction over the plugins themselves, ensuring that the actual details of loading plugins and querying out to individual cloud services does not need to be a concern of, for example, the targets' service when performing session authorization. This allows the repository to present a path to querying for all of the hosts in a dynamic host set, similar to a ListHosts query for static host sets. The plugin-based host model can be formed in a memory by a model generator of the identity-based access management system. In some implementations, the model generator can be a software module that is executable by a processor.

Figure 6:
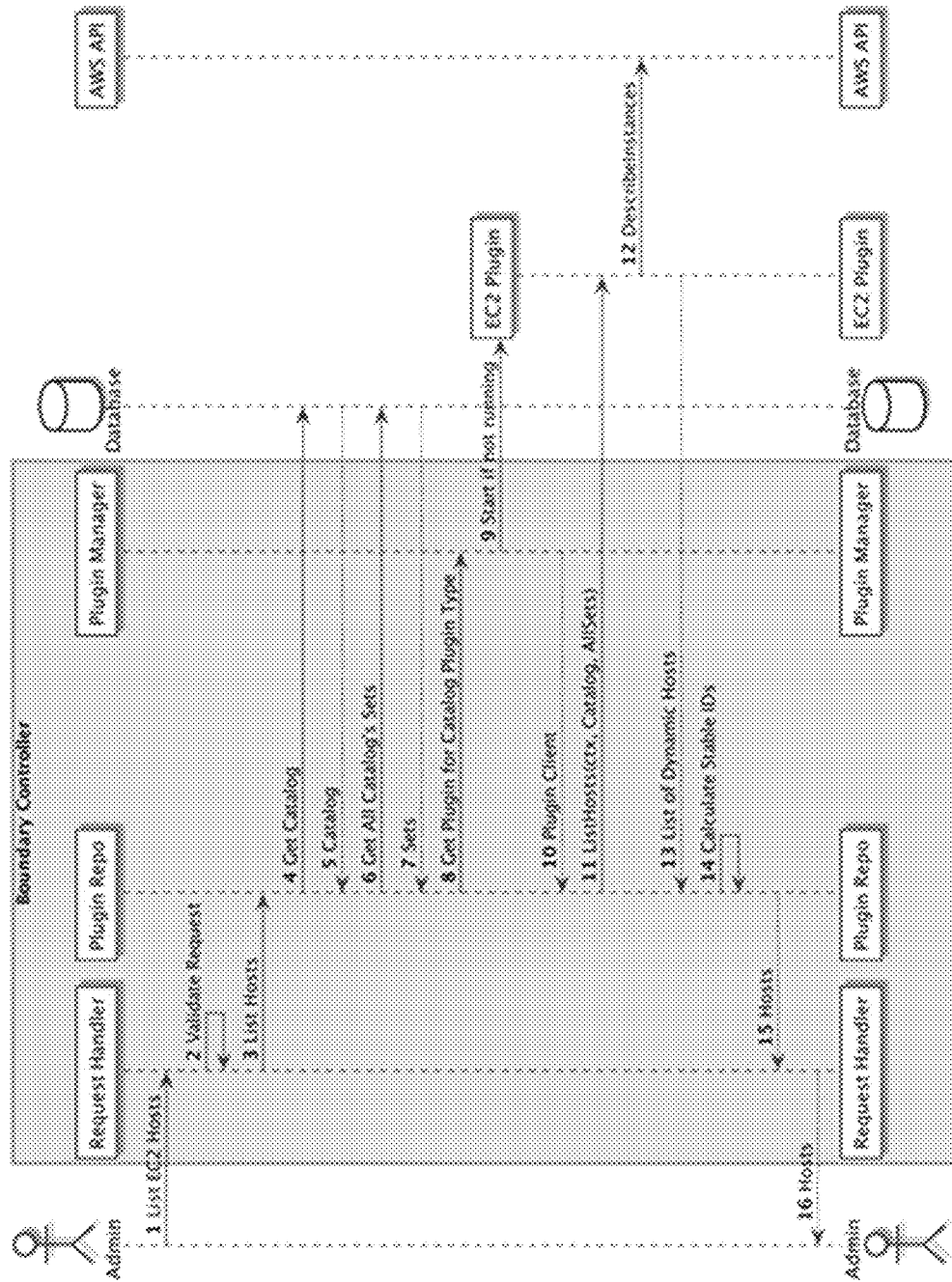
FIG. 6 is a workflow diagram illustrating a process for querying hosts, and which can be made available at the host catalog level and at the host set level.

In some exemplary implementations, host information, such as identifiers and metadata, may or may not be persisted within the identity-based access management system. In some cases, hosts need not be persisted initially but can be generated with a stable identifier that can be used to distinguish one host from others. The sequence diagram in FIG. 6 shows a workflow for querying hosts, and can be made available at the host catalog level (as described in the diagram), and at the host set level (steps 8 to 15 and 16). Calling out to a particular plugin or provider is something that can be handled by the host set service initially. Alternatively, calling out to a particular plugin or provider is something that can be performed by various parts of the identity-based access management system, such as via its host catalogs or host sets, as illustrated in FIG. 6.

Plugin Framework for Host Catalogs

Consistent with implementations described herein, a framework for plugin host resources is provided. This can include a plugin software development kit (SDK), first for host catalogs and sets, and then eventually encompassing a much larger SDK that can support multiple functions to implement as part of an identity-based access management system ecosystem.

Host Plugin Interface

Virtual Host Entries

In some cases, hosts are provided as persisted, cached entries retrieved via plugin-based host sets (i.e.: for the results of the ListHosts call above), and initially these need not be stored in the database. However, while not having physical entries, hosts may still be returned as host resources with a stable ID. A similar method can be used for host entries, and can be continued to be used to calculate stable data for cached entries when this data is eventually persisted.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system for accessing, by a client computer via an identity-based access management system of a cloud computing infrastructure, one or more addressable computing elements of the cloud computing infrastructure, the system comprising:
- a server computer providing a dynamic host interface associated with the identity-based access management system, the dynamic host interface being configured to receive one or more host catalogs from one or more components of the cloud computing infrastructure, each of the one or more host catalogs comprising one or more host sets, each of the one or more host sets comprising references to one or more hosts, and each of the one or more hosts representing one of the one or more addressable computing elements; and
- a model generator executed by the server computer and configured to form a plugin-based hosts model in a memory associated with the identity-based access management system, the plugin-based hosts model being configured to receive, from the dynamic host interface, the one or more host catalogs for identity-based access to the one or more host sets by a user of the client computer to address the one or more addressable computing elements of the cloud computing infrastructure represented by the one or more hosts
- wherein the identity-based access management system includes a common programming interface that can be used by plugins to receive requests for resources from a cloud provider and map resources to a host/host-set/host-catalog model;
- wherein the plugin-based hosts model comprises a secrets field for storing credential data associated with the one or more hosts, the secrets field being configured such that credential data is encrypted before being written to persistent storage and is not returned by any read operation through the common programming interface, thereby making the secrets field write-only through the common programming interface;
- wherein the model generator is further configured to, in response to a request for hosts, generate virtual host entries on-demand in memory, assign each virtual host entry a deterministic stable identifier, and discard the virtual host entries after completion of the request, such that the hosts obtained from a cloud provider are not persisted in storage; and
- wherein, for each Create, Read, Update, Delete, or List (CRUDL) operation performed on a host catalog or host set, the identity-based access management system is configured to invoke plugin-specific validation hooks that (i) verify the correctness of attributes, (ii) mutate or reject credential data, and (iii) determine host-set availability.

2. The system in accordance with claim 1, wherein the plugin-based hosts model configures the one or more host sets according to a filter.

3. The system in accordance with claim 2, wherein the filter is used to categorize the host sets in the plugin-based hosts model according to one or more filter attributes.

4. The system in accordance with claim 1, further comprising an application programming interface (API) associated with the identity-based access management system, for receiving requests for access to the one or more addressable computing elements by the user of the client computer.

5. The system in accordance with claim 1, wherein the plugin-based hosts model is configured to inform the identity-based access management system of which of the one or more host sets are available to the user of the client computer.

6. A system for accessing, by a client computer via an identity-based access management system of a cloud computing infrastructure, one or more computing elements of the cloud computing infrastructure, the system comprising:
- a server computer providing a dynamic host interface associated with the identity-based access management system, the dynamic host interface being configured to receive a host catalog from a component of the cloud computing infrastructure, the host catalog comprising one or more host sets, each of the one or more host sets comprising references to one or more hosts, and each of the one or more hosts representing one of the one or more computing elements of the cloud computing infrastructure; and
- a model generator executed by the server computer and configured to form a plugin-based hosts model in a memory associated with the identity-based access management system, the plugin-based hosts model being configured to receive, from the dynamic host interface, the host catalog to execute identity-based access to the one or more host sets by a user of the client computer to address the one or more computing elements of the cloud computing infrastructure represented by the one or more hosts wherein the identity-based access management system includes a common programming interface that can be used by plugins to receive requests for resources from a cloud provider and map resources to a host/host-set/host-catalog model;
- wherein the plugin-based hosts model comprises a secrets field for storing credential data associated with the one or more hosts, the secrets field being configured such that credential data is encrypted before being written to persistent storage and is not returned by any read operation through the common programming interface, thereby making the secrets field write-only through the common programming interface;
- wherein the model generator is further configured to, in response to a request for hosts, generate virtual host entries on-demand in memory, assign each virtual host entry a deterministic stable identifier, and discard the virtual host entries after completion of the request, such that the hosts obtained from a cloud provider are not persisted in storage; and
- wherein, for each Create, Read, Update, Delete, or List (CRUDL) operation performed on a host catalog or host set, the identity-based access management system is configured to invoke plugin-specific validation hooks that (i) verify the correctness of attributes, (ii) mutate or reject credential data, and (iii) determine host-set availability.

7. The system in accordance with claim 6, wherein the plugin-based hosts model configures the one or more host sets according to a filter.

8. The system in accordance with claim 7, wherein the filter is used to categorize the host sets in the plugin-based hosts model according to one or more filter attributes.

9. The system in accordance with claim 6, further comprising an application programming interface (API) associated with the identity-based access management system, for receiving requests for access to the one or more computing elements by the user of the client computer.

10. The system in accordance with claim 6, wherein the plugin-based hosts model is configured to inform the identity-based access management system of which of the one or more host sets are available to the user of the client computer.

\* \* \* \* \*